(12) United States Patent
Swisher et al.

(10) Patent No.: US 12,243,503 B1
(45) Date of Patent: Mar. 4, 2025

(54) SYSTEMS AND METHODS FOR MANAGING VEHICLE WORKSPACE

(71) Applicant: Ford Global Technologies, LLC, Dearborn, MI (US)

(72) Inventors: Zackary Swisher, Taylor, MI (US); Keith Weston, Canton, MI (US); Stuart C. Salter, White Lake, MI (US); Brendan Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/456,875

(22) Filed: Aug. 28, 2023

(51) Int. Cl.
| | |
|---|---|
| *G09G 5/10* | (2006.01) |
| *G06F 3/042* | (2006.01) |
| *G06T 7/70* | (2017.01) |
| *G06V 20/59* | (2022.01) |
| *B60J 3/04* | (2006.01) |

(52) U.S. Cl.
CPC ............. *G09G 5/10* (2013.01); *G06F 3/0425* (2013.01); *G06T 7/70* (2017.01); *G06V 20/597* (2022.01); *B60J 3/04* (2013.01); *G06T 2207/30268* (2013.01); *G09G 2320/0626* (2013.01); *G09G 2340/0435* (2013.01); *G09G 2354/00* (2013.01); *G09G 2380/10* (2013.01)

(58) Field of Classification Search
CPC ....... G06F 3/0483; G06V 20/597; G06T 7/00; G09G 5/10
See application file for complete search history.

(56) References Cited

U.S. PATENT DOCUMENTS

| | | | | |
|---|---|---|---|---|
| 5,106,141 | A | 4/1992 | Mostashari | |
| 2016/0334868 | A1* | 11/2016 | Pacheco | ................. G06F 3/013 |
| 2019/0258253 | A1* | 8/2019 | Tremblay | .......... B60W 60/0016 |

FOREIGN PATENT DOCUMENTS

| | | | | |
|---|---|---|---|---|
| CN | 103219032 | A | 7/2013 | |
| CN | 204222776 | U | 3/2015 | |
| CN | 106663400 | * | 6/2020 | ............. G09G 3/002 |
| EP | 3945738 | A1 | 2/2022 | |
| GB | 2536090 | A | 7/2016 | |

OTHER PUBLICATIONS

Designing a New UX Concept to Reduce Driver Distraction, The Turn Signal, Jun. 2019, pp. 1-18.

* cited by examiner

*Primary Examiner* — Nelson M Rosario
*Assistant Examiner* — Scott D Au
(74) *Attorney, Agent, or Firm* — Frank Lollo; Eversheds Sutherland (US) LLP

(57) ABSTRACT

A vehicle having a first vehicle device configured to provide inputs to a first user device associated with a first user is disclosed. The vehicle further comprises a camera configured to capture images of the first user in the vehicle. The vehicle further comprises processor configured to obtain the images from the camera, and determine that the first user is operating the first user device in the vehicle based on the images. The processor may be further configured to determine an availability of the first vehicle device responsive to a determination that the first user is operating the first user device, and activate the first vehicle device to enable the first user to operate the first user device via the first vehicle device when the first vehicle device is available.

18 Claims, 6 Drawing Sheets

SYSTEMS AND METHODS FOR MANAGING VEHICLE WORKSPACE

FIELD

The present disclosure relates to systems and methods for managing vehicle workspace and more particularly to systems and methods for enabling a vehicle user to operate a user device via vehicle components.

BACKGROUND

Modern vehicles include various features to provide comfortable environment to vehicle users. Despite having such features, vehicle users/occupants desire for more features in their vehicles that may provide better user experience. For example, the vehicle users may desire for a work environment or workspace in their vehicles that facilitates the vehicle users to conveniently work from inside the vehicles. Thus, there exists a need for a vehicle workspace environment inside a vehicle to provide better user experience.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
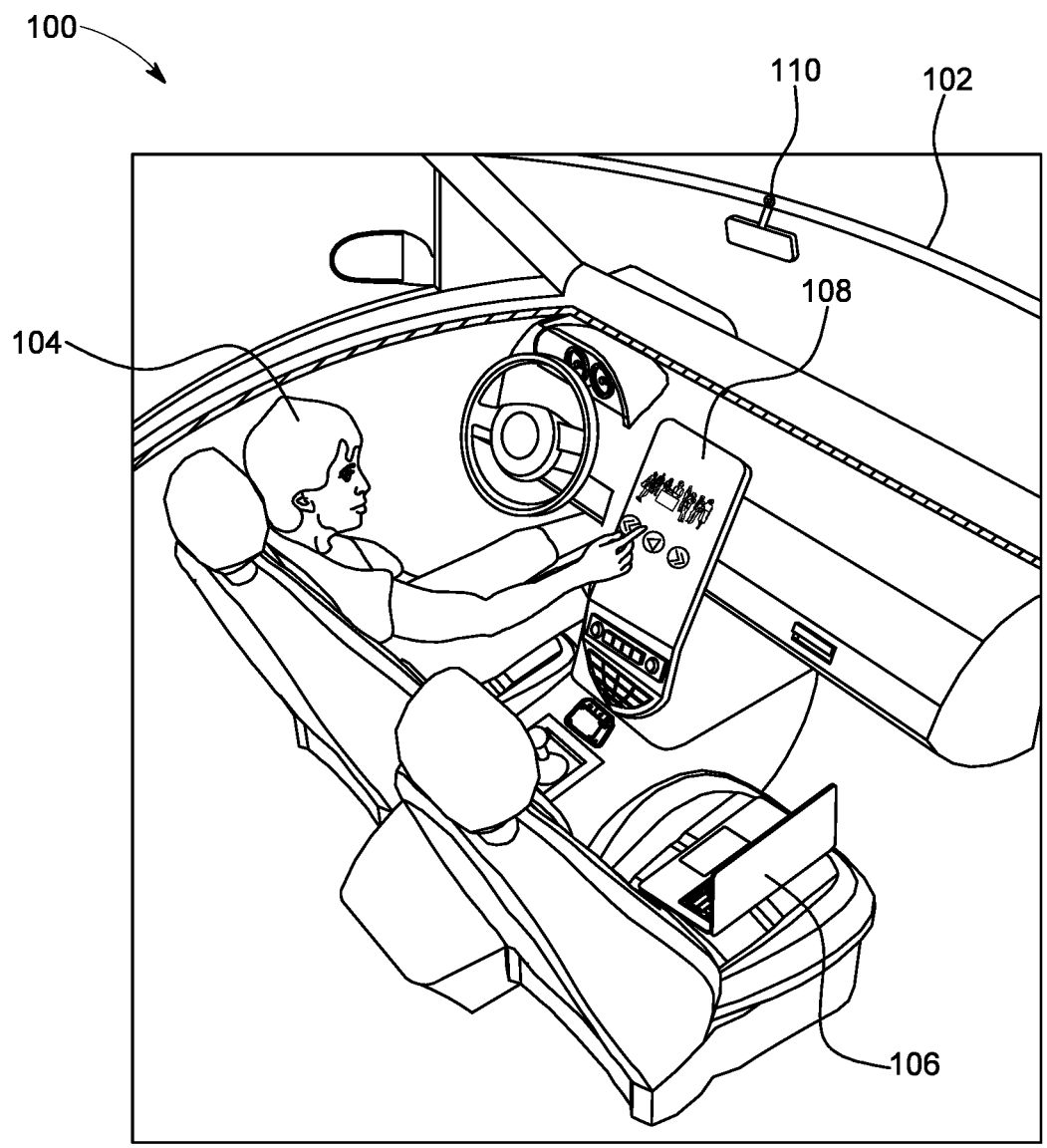
FIG. 1 depicts an example environment of a parked vehicle in which techniques and structures for providing the systems and methods disclosed herein may be implemented.

The present disclosure describes a vehicle configured to enable a vehicle user/occupant to operate a user device (e.g., a laptop, a tablet, etc.) from inside the vehicle using vehicle components (or vehicle input devices). The vehicle input devices may include, for example, vehicle display screens, track pads, a monostable shifter, and/or the like. The vehicle input devices may be communicatively coupled to the user device and may be configured to provide inputs to the user device. Specifically, the user may control or operate the user device via one or more vehicle input devices. In some aspects, the vehicle may include a workspace management system/unit ("system") that may be configured to manage (e.g., activate or deactivate) the vehicle input devices for the user device to enable the user to operate the user device via the vehicle input devices.

The system may be communicatively coupled to a vehicle camera that may capture images of the vehicle user (and other users) in the vehicle. The system may obtain the images and may determine that the vehicle user may be operating (or desires to operate) the user device in the vehicle. For example, the system may determine that the vehicle user has opened the laptop or (a laptop desk) to operate the laptop in the vehicle. Responsive to the determination that the vehicle user may be operating (or desires to operate) the user device in the vehicle, the system may determine vehicle input devices availability and may activate the vehicle input devices for the user device when respective vehicle input devices may be available. For example, the system may configure the vehicle display screen to act as an extended screen for the user device (or augment user device screen), the track pad to act as a mouse for the user device, and the monostable shifter to act as a joystick for the user device, when respective vehicle input devices may be available for the user device.

In some aspects, the system may receive a request from the user (e.g., via the user device or the vehicle display screen) to use/allocate a vehicle input device for the user device to enable the user to use the user device via the vehicle input device. Responsive to receiving the request, the system may determine the vehicle input device availability and accordingly activate the vehicle input device for the user device when the vehicle input device may be available.

When the vehicle includes more than one occupant, the system may be configured to detect a count of users that may be operating their respective user devices in the vehicle, and may be configured to prioritize vehicle input device access based on the detection. In some aspects, the system may prioritize the access based on sitting position of each user in the vehicle. For example, a user sitting at a driver sitting area may get preference to use a display screen in proximity to a vehicle front portion, as opposed to users sitting in a passenger sitting area or a rear sitting area. In further aspects, the system may allow multiple users to share a vehicle input device. For example, a first screen portion may be allocated to one user and a second screen portion may be allocated to another user.

The present disclosure discloses a vehicle that assists the vehicle user to use the user device via the vehicle input devices, which may increase user productivity in the vehicle. In addition, the system may enable multiple users to share the vehicle display screen amongst each other, which may increase screen utilization. Furthermore, the system may enable multiple users to share content on different portions of a single screen without getting physically close to each other in the vehicle, which may prevent spreading of viruses or illness.

These and other advantages of the present disclosure are provided in detail herein. The systems and method of the present disclosure should not be permitted unless the vehicle is in park, off, not in motion, and/or otherwise in a safe operational mode for enjoyment of the disclosure systems and methods, which mode may include operating in a fully autonomous vehicle, as an example.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 that may take the form of any passenger or commercial vehicle such as, for example, a car, a work vehicle, a crossover vehicle, a truck, a van, a minivan, a taxi, a bus, etc. The vehicle 102 may be a manually driven vehicle, and/or may be configured to operate in a partially autonomous mode, and may include any powertrain such as, for example, a gasoline engine, one or more electrically-actuated motor(s), a hybrid system, etc. A vehicle user 104 (or a driver 104) may be sitting inside the vehicle 102. In some aspects, the vehicle 102 may be stationary and may not be moving.

In some aspects, the vehicle 102 may be configured to provide a work-environment to the vehicle user 104 (or other users or vehicle occupants) such that the vehicle user 104 may conveniently operate a user device 106 associated with the vehicle user 104 inside the vehicle 102 via one or more vehicle components (or vehicle input devices). The user device 106 may include, but is not limited to, a laptop, a mobile phone, a computer, a tablet, a wearable device, or any other similar device with communication capabilities. The vehicle input devices may include, but are not limited to, a display screen 108 (or a vehicle touch screen), a vehicle track pad (shown as track pad 302 in FIG. 3), a monostable shifter (shown as monostable shifter 304 in FIG. 3), and/or the like. The vehicle input devices may be communicatively coupled to the user device 106 (or other user devices) via a network (shown as network 208 in FIG. 2). Further, the vehicle input devices may be configured to provide inputs to the user device 106 when the vehicle user 104 operate the user device 106 via the vehicle input devices.

The vehicle 102 may further include a vehicle workspace management unit (shown as workspace management unit 214 in FIG. 2) that may be configured to manage the vehicle input devices to enable the vehicle user 104 to use the user device 106 inside the vehicle 102. In some aspects, the vehicle workspace management unit (or unit) may be configured to receive inputs (e.g., images) from a vehicle camera 110 and may determine that the vehicle user 104 may be operating (or desires to operate) the user device 106 based on the inputs. For example, the unit may determine that user has opened the laptop to work inside the vehicle 102 based on the images captured from the camera 110 (or based on user inputs). In other aspects, the unit may determine that the vehicle user 104 desires to operate the user device 106 via the vehicle input devices based on user inputs received from the vehicle user 104. In some aspects, the unit may receive the user inputs from the user device 106 or from the vehicle input devices (e.g., via the display screen 108).

Responsive to the determination that the vehicle user 104 may be operating (or may want/desire to operate) the user device 106, the unit may determine availability of one or more vehicle input device(s). The unit may allocate the vehicle input device(s) to the vehicle user 104 based on the vehicle input device availability. The unit may further activate the vehicle input device(s) to enable the vehicle user 104 to operate the user device 106 via the vehicle input device(s) when the vehicle input device(s) is available. For example, the unit may activate the display screen 108 for the user device 105 to enable the vehicle user 104 to operate (or to provide inputs to) the user device 106 via the display screen 108. Stated another way, the unit may control the display screen 108 such that the display screen 108 may act as an extended screen of the user device 106. In such scenarios, the display screen 108 may display content associated with the user device 106. In a similar manner, the unit activate the vehicle track pad and/or the monostable shifter for the user device 106 to enable the vehicle user 104 to operate the user device 106 via respective vehicle input device(s).

Further details of the vehicle 102 are described below in conjunction with FIG. 2.

The vehicle 102 and/or the vehicle user 104 implement and/or perform operations, as described here in the present disclosure, in accordance with the owner manual and safety guidelines.

Figure 2:
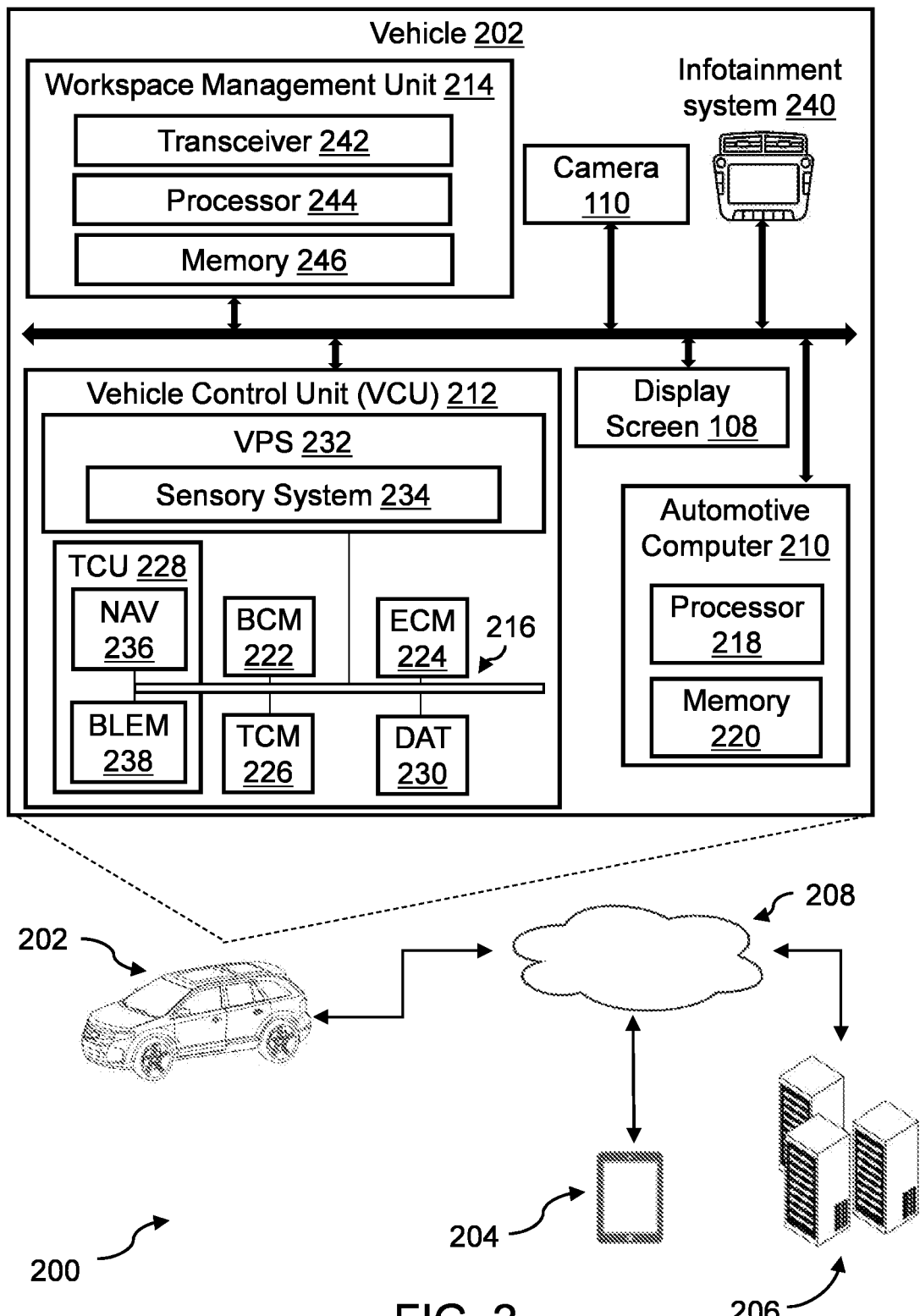
FIG. 2 depicts a block diagram of an example system for managing vehicle workspace in accordance with the present disclosure.
Figure 3:
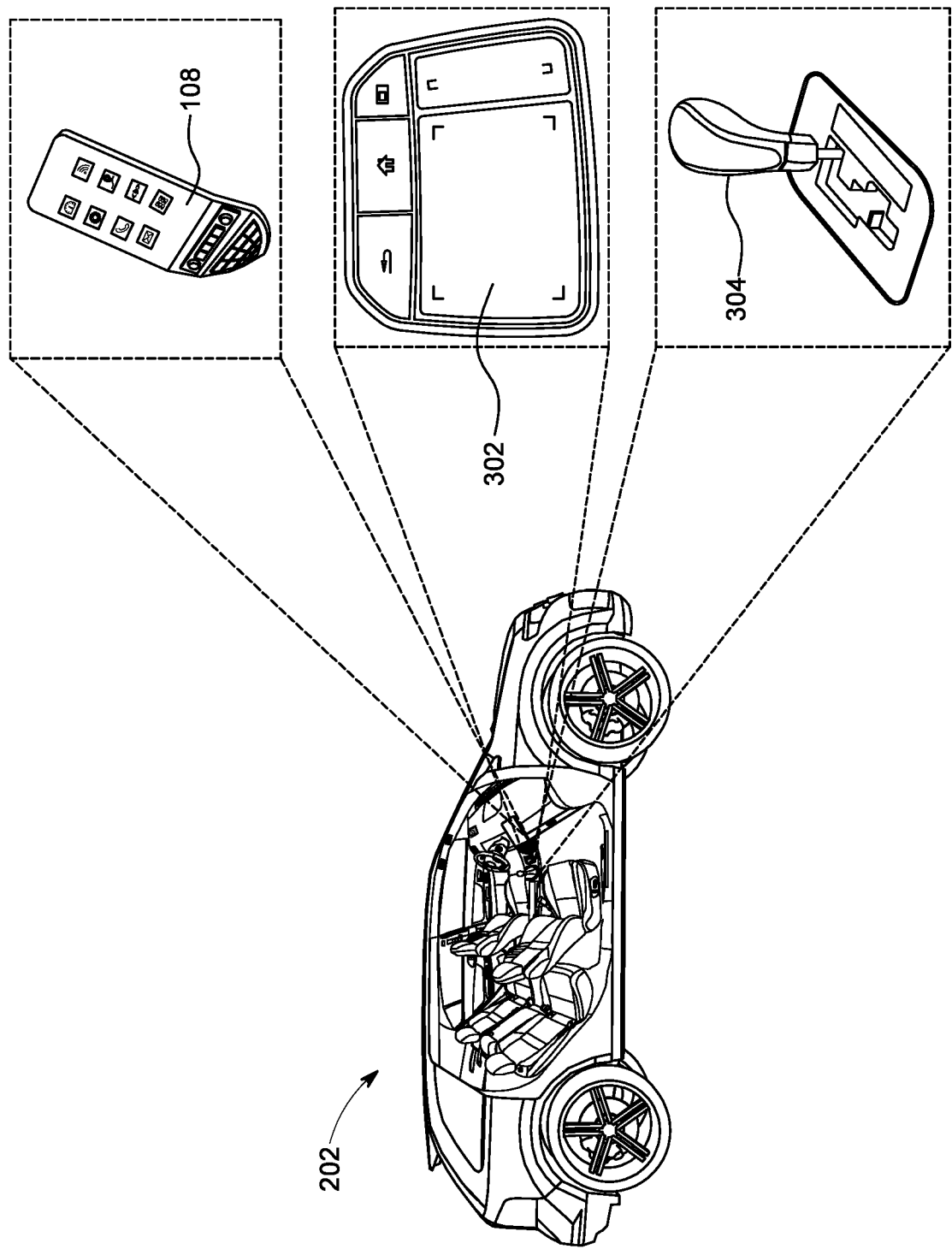
FIG. 3 depicts example vehicle input devices used to operate a user device in accordance with the present disclosure.
Figure 4:
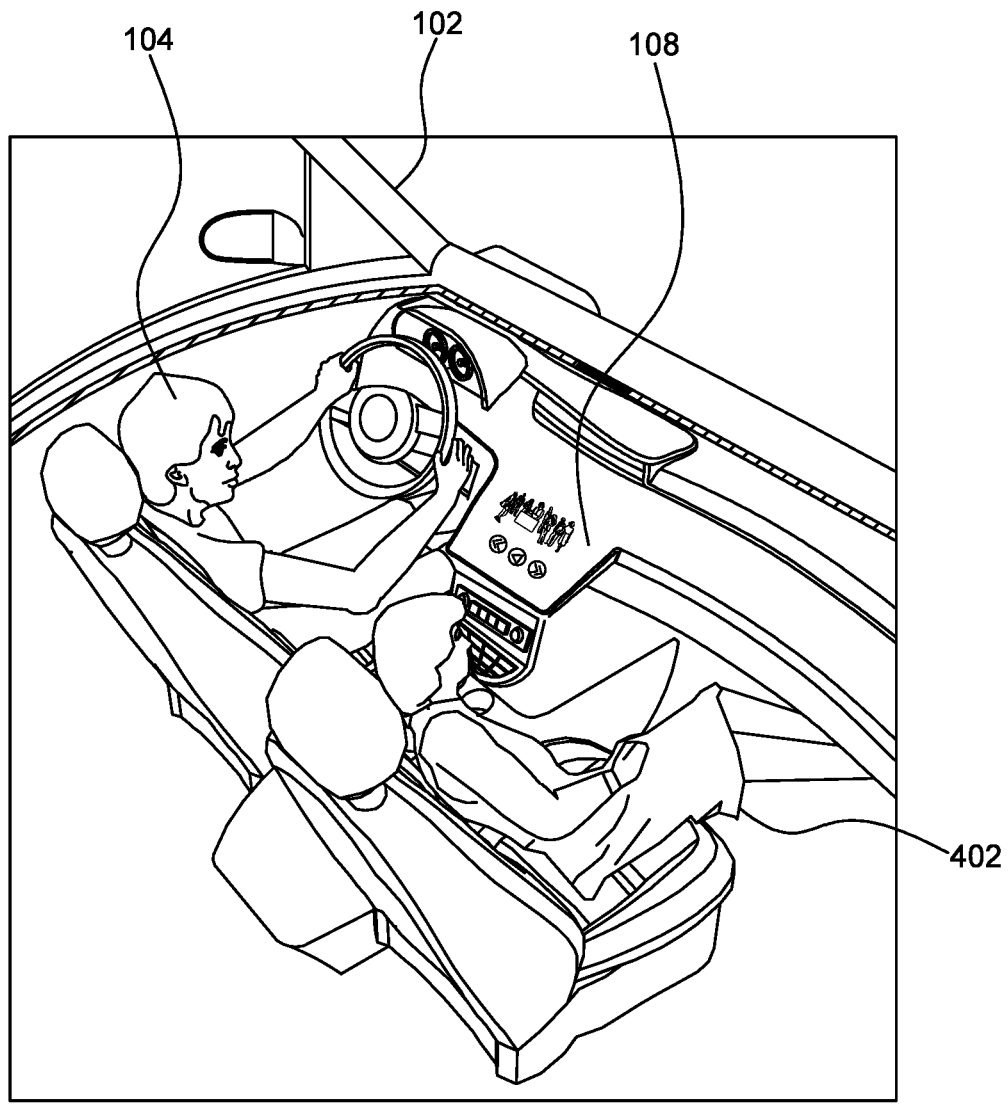
FIG. 4 depicts a first example embodiment to control multiple vehicle input devices in accordance with the present disclosure.
Figure 5:
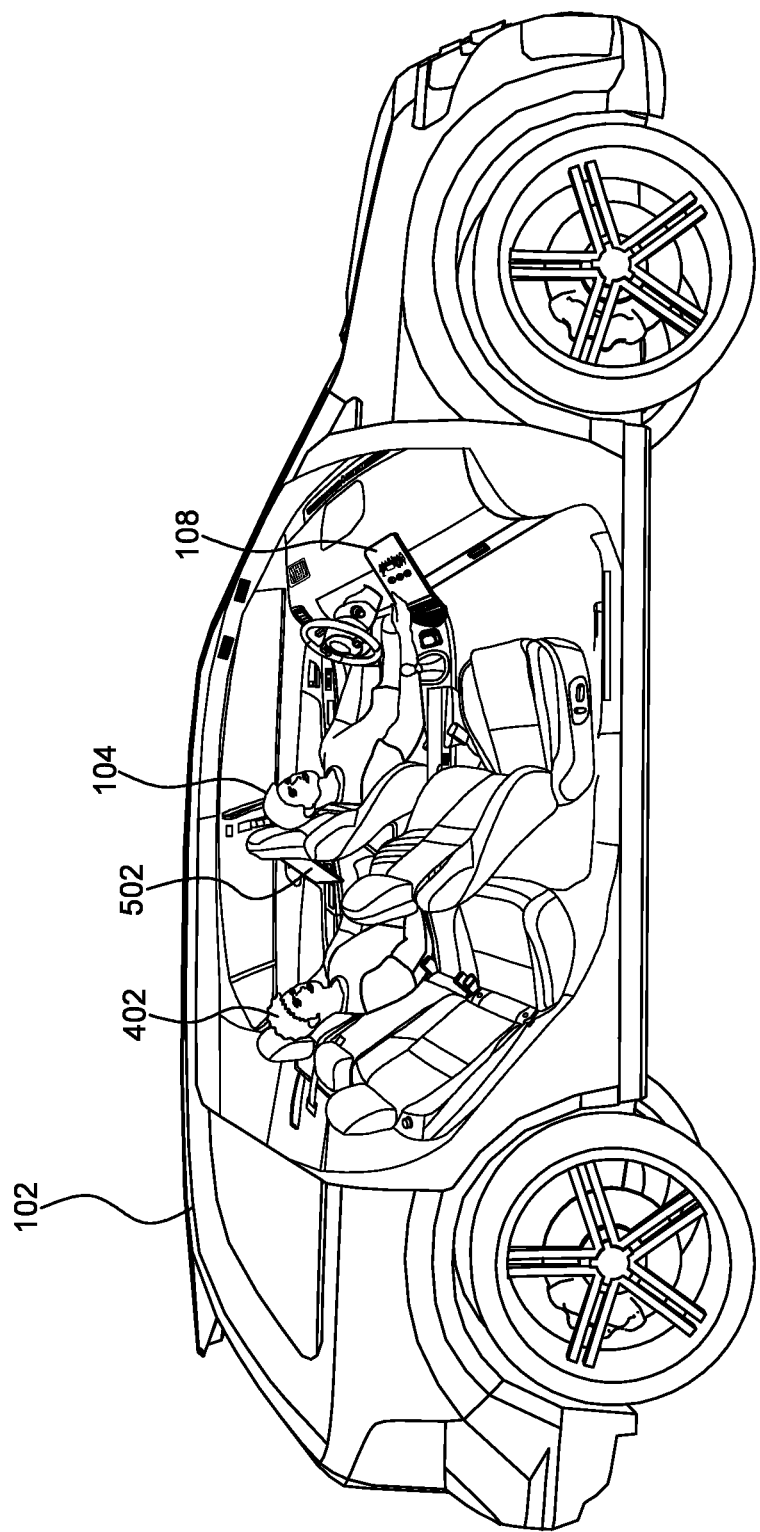
FIG. 5 depicts a second example embodiment to control multiple vehicle input devices in accordance with the present disclosure.

FIG. 2 depicts a block diagram of an example system 200 for managing vehicle workspace in accordance with the present disclosure. While describing FIG. 2, references may be made to FIGS. 3, 4 and 5. FIG. 3 depicts example vehicle input devices used to operate a user device in accordance with the present disclosure. FIG. 4 depicts a first example embodiment to control multiple vehicle input devices, and FIG. 5 depicts a second example embodiment to control multiple vehicle input devices in accordance with the present disclosure.

The system 200 may include a vehicle 202, a user device 204, and one or more servers 206 communicatively coupled with each other via one or more networks 208. The vehicle 202 may be same as the vehicle 102 described in conjunction with FIG. 1. The user device 204 may be same as the user device 106. The server(s) 206 may be part of a cloud-based computing infrastructure and may be associated with and/or include a Telematics Service Delivery Network (SDN) that provides digital data services to the vehicle 202 and other vehicles (not shown in FIG. 2) that may be part of a commercial vehicle fleet. In some aspects, the server 206 may be configured to store information associated with vehicle input devices allocation or assignment.

The network(s) 208 illustrates an example communication infrastructure in which the connected devices discussed in various embodiments of this disclosure may communicate. The network(s) 208 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units including, but not limited to, an automotive computer 210, a Vehicle Control Unit (VCU) 212, and a workspace management unit 214. The VCU 212 may include a plurality of Electronic Control Units (ECUs) 216 disposed in communication with the automotive computer 210.

The user device 204 may connect with the automotive computer 210 and/or the workspace management unit 214 via the network 208, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques.

In some aspects, the automotive computer 210 and/or the workspace management unit 214 may be installed in a vehicle engine compartment (or elsewhere in the vehicle 202), in accordance with the disclosure. Further, the automotive computer 210 may operate as a functional part of the workspace management unit 214. The automotive computer 210 may be or include an electronic vehicle controller, having one or more processor(s) 218 and a memory 220. Moreover, the workspace management unit 214 may be separate from the automotive computer 210 (as shown in FIG. 2) or may be integrated as part of the automotive computer 210.

The processor(s) 218 may be disposed in communication with one or more memory devices disposed in communication with the respective computing systems (e.g., the memory 220 and/or one or more external databases not shown in FIG. 2). The processor(s) 218 may utilize the memory 220 to store programs in code and/or to store data for performing aspects in accordance with the disclosure. The memory 220 may be a non-transitory computer-readable storage memory storing a workspace management program code. The memory 220 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 212 may share a power bus with the automotive computer 210 and may be configured and/or programmed to coordinate the data between vehicle systems, connected servers (e.g., the server(s) 206), and other vehicles (not shown in FIG. 2) operating as part of a vehicle fleet. The VCU 212 can include or communicate with any combination of the ECUs 216, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 212 may further include and/or communicate with a Vehicle Perception System (VPS) 232, having connectivity with and/or control of one or more vehicle sensory system(s) 234. The vehicle sensory system 234 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging (LiDAR or "lidar") sensor, door sensors, proximity sensors, temperature sensors, wheel sensors, vehicle internal and external cameras, etc. In some aspects, the vehicle interior camera (e.g., the camera 110) may be configured to capture images of the vehicle user 104 or other vehicle users/occupants in the vehicle 202.

In some aspects, the VCU 212 may control vehicle operational aspects and implement one or more instruction sets received from the user device 204, from one or more instruction sets stored in the memory 220, including instructions operational as part of the workspace management unit 214.

The TCU 228 may be configured and/or programmed to provide vehicle connectivity to wireless computing systems onboard and off board the vehicle 202, and may include a Navigation (NAV) receiver 236 for receiving and processing a GPS signal, a BLE® Module (BLEM) 238, a Wi-Fi transceiver, a UWB transceiver, and/or other wireless transceivers (not shown in FIG. 2) that may be configurable for wireless communication (including cellular communication) between the vehicle 202 and other systems (e.g., a vehicle key fob, not shown in FIG. 2), computers, and modules. The TCU 228 may be disposed in communication with the ECUs 216 by way of a bus.

The ECUs 216 may control aspects of vehicle operation and communication using inputs from human drivers, inputs from an autonomous vehicle controller, the workspace management unit 214, and/or via wireless signal inputs received via the wireless connection(s) from other connected devices, such as the user device 204, the server(s) 206, among others.

The BCM 222 generally includes integration of sensors, vehicle performance indicators, and variable reactors associated with vehicle systems, and may include processor-based power distribution circuitry that can control functions associated with the vehicle body such as lights, windows, security, camera(s) including the camera 110, audio system(s), speakers, wipers, door locks and access control, and various comfort controls. In some aspects, the BCM 222 may additionally control operation/function of the display screen 108, a track pad 302 and a monostable shifter 304 (shown in FIG. 3). The BCM 222 may also operate as a gateway for bus and network interfaces to interact with remote ECUs (not shown in FIG. 2).

The DAT controller 230 may provide Level-1 through Level-3 automated driving and driver assistance functionality that can include, for example, active parking assistance, vehicle backup assistance, adaptive cruise control, and/or lane keeping, among other features. The DAT controller 230 may also provide aspects of user and environmental inputs usable for user authentication.

In some aspects, the automotive computer 210 may connect with an infotainment system 240. The infotainment system 240 may include a touchscreen interface portion, and may include voice recognition features, biometric identification capabilities that can identify users based on facial recognition, voice recognition, fingerprint identification, or other biological identification means. In other aspects, the infotainment system 240 may be further configured to receive user instructions via the touchscreen interface portion, and/or display notifications (including visual alert notifications), navigation maps, etc. on the touchscreen interface portion.

The vehicle 202 may further include the camera 110 and the display screen 108, as described in conjunction with FIG. 1.

The computing system architecture of the automotive computer 210, the VCU 212, and/or the workspace management unit 214 may omit certain computing modules. It should be readily understood that the computing environment depicted in FIG. 2 is an example of a possible implementation according to the present disclosure, and thus, it should not be considered limiting or exclusive.

In accordance with some aspects, the workspace management unit 214 may be integrated with and/or executed as part of the ECUs 216. The workspace management unit 214, regardless of whether it is integrated with the automotive computer 210 or the ECUs 216, or whether it operates as an independent computing system in the vehicle 202, may include a transceiver 242, a processor 244, and a computer-readable memory 246.

The transceiver 242 may be configured to receive information/inputs from one or more external devices or systems, e.g., the user device 204, the server(s) 206, and/or the like via the network 208. Further, the transceiver 242 may transmit inputs or notifications (e.g., alert/alarm signals) to the external devices or systems. In addition, the transceiver 242 may be configured to receive information/inputs from vehicle components (or vehicle input devices) such as the display screen 108, the track pad 302, the monostable shifter 304 (as shown in FIG. 3), and the camera 110. Further, the transceiver 242 may transmit notifications (e.g., alert/alarm signals) to the vehicle components such as the infotainment system 240, the vehicle input devices, vehicle speaker system, etc.

In some aspects, the vehicle input devices may be communicatively coupled to the user device 204 (or other user devices) and may be configured to receive/provide inputs from/to user device 204 via the transceiver 242. For example, the track pad 302 may be used in place of computer/laptop mouse, and may be used to control user device operation. Similarly, the monostable shifter 304 may be used as a joystick for the user device 204, and the display screen 108 may communicate inputs to the user device 204 and may display content associated with the user device 204.

The processor 244 and the memory 246 may be same as or similar to the processor 218 and the memory 220, respectively. In some aspects, the processor 244 may utilize the memory 246 to store programs in code and/or to store data for performing aspects in accordance with the disclosure. The memory 246 may be a non-transitory computer-readable storage memory storing the workspace management program code. In some aspects, the memory 246 may additionally store information associated with the vehicle 202 and one or more sensory inputs received from the vehicle sensory system 234 (e.g., the camera 110), user inputs received from the user device 204 or other devices (e.g., the infotainment system 240 or the vehicle input devices). The memory 246 may further store information associated with vehicle input devices allocation, e.g., the display screen 108, the track pad 302, the monostable shifter 304, and/or the like.

In operation, the processor 244 may obtain inputs from the camera 110, via the transceiver 242. The inputs may include images captured by the camera 110, which may include images of the vehicle user 104 and other users/occupants who may be located inside the vehicle 202. The processor 244 may be configured to monitor activity of the vehicle user 104 and other users/occupants inside the vehicle 202 based on the images obtained from the camera 110. Specifically, the processor 244 may be configured to determine that the vehicle user 104 (e.g., a first user 104 shown in FIG. 1, or any other user) may be operating the user device 204 in the vehicle 202 based on the obtained images. For example, the processor 244 may determine that the first user 104 may have opened a laptop (i.e., the user device 204) in the vehicle 202.

Responsive to a determination that the first user 104 (or any other user) may be operating the user device 204 in the vehicle 202, the processor 244 may determine an availability of a vehicle input device that may assist or enable the first user 104 to operate the user device 106 via the vehicle input device. As described above, the vehicle input device may include, but is not limited to, the display screen 108, the track pad 302 and the monostable shifter 304. The processor 244 may be further configured to activate the vehicle input device to enable the first user 104 to operate the user device 106 via the vehicle input device when the vehicle input device may be available.

In some aspects, the processor 244 may obtain information associated with the vehicle input device allocation from the memory 246 (or the server 206), and may determine the vehicle input device availability using the obtained information. For example, the processor 244 may determine whether the vehicle input device may be allocated to another user/occupant (specifically to their respective user devices) in the vehicle 202, and may accordingly determine the vehicle input device availability. Specifically, the processor 244 may determine the vehicle input device to be available when the vehicle input device may not be allocated to any other user/occupant.

In additional aspects, the processor 244 may be configured to determine vehicle input device usage when the vehicle input device may be allocated to a user/occupant, and may determine vehicle input device availability based on the usage. Specifically, the processor 244 may determine that the vehicle input device may be available when no user/occupant may be actively using the vehicle input device, even though the vehicle input device may be allocated to a user/occupant. For example, when the vehicle input device may be allocated to a user (e.g., a second user 402 in the vehicle 202, as shown in FIG. 4) and the processor 244 determines that the second user 402 may not be using the vehicle input device, the processor 244 may determine that the vehicle input device may be available, and may allocate the vehicle input device to the first user 104 (specifically to the user device 204). In this case, the processor 244 may "deactivate" the vehicle input device from the second user 402 when the processor 244 allocates the vehicle input device to the first user 104. As another example, when the processor 244 determines that only a single user (e.g., the first user 104) may be operating a user device (e.g., the user device 204), the processor 244 may determine that the vehicle input device may be available as no other user may be operating their respective user device(s) in the vehicle 202, and may allocate the vehicle input device to the first user 104/user device 204.

In further aspects, the processor 244 may be configured to obtain a request, via the transceiver 242, from the first user 104 (or other users/occupants) to use/allocate the vehicle input device to operate the user device 204 (or respective user devices). In some aspects, the processor 244 may obtain the request from the first user 104 via the user device 204, the server 206, and/or one or more vehicle components (e.g., the infotainment system 240, the display screen 108, etc.). Responsive to obtaining the request, the processor 244 may determine vehicle input device(s) availability, and may allocate the vehicle input device to the first user 104/user device 204 when the vehicle input device may be available.

In additional aspects, the processor 244 may be configured to determine that multiple users may be operating (or desire to operate) their respective user devices in the vehicle 202. In such a scenario, the processor 244 may prioritize vehicle input device(s) access, and may allocate the vehicle input devices to the first user 104 or the second user 402 based on the prioritization. In this case, the processor 244 may obtain images from the camera 110 (that may capture images of the first user 104 and the second user 402 in the vehicle 202), and may determine that the first user 104 and the second user 402 may be operating (or desire to operate) their respective user devices in the vehicle 202 based on the obtained images. In alternative aspects, the processor 244 may obtain respective requests from the first user 104 and the second user 402 to use a vehicle input device (e.g., a first vehicle input device such as the display screen 108 that may be an auxiliary vehicle screen), and may determine that the first user 104 and the second user 402 may desire to operate their respective user devices via the display screen 108, based on the obtained requests.

When the processor 244 determines that both the first user 104 and the second user 402 desire to operate their respective user devices via the display screen 108, in some aspects, the processor 244 may determine respective sitting positions of the first user 104 and the second user 402 inside the vehicle 202. In some aspects, the processor 244 may determine the sitting positions based on inputs obtained from the sensory system 234. Responsive to determining the sitting positions, the processor 244 may prioritize access/allocation of the display screen 108 to either the first user 104 or the second user 402 based on the determined sitting position.

For example, the processor 244 may determine that the first user 104 may be sitting in the driver sitting area and the second user 402 may be sitting in a front passenger sitting area (as depicted in FIG. 4) based on the inputs obtained from the sensory system 234. In this case, the processor 244 may prioritize allocation of the display screen 108 to the first user 104 (or the user device 204) over the second user 402, and may allocate the display screen 108 to the first user 104. Stated another way, in an exemplary aspect, a user sitting in a driver sitting area may get priority over a user sitting in a passenger sitting area to access the display screen 108 to operate the user device 204. The processor 244 may activate the display screen 108 to enable the first user 104 to control the user device 204 via the display screen 108. In such scenarios, the display screen 108 may display content associated with the user device 204.

In further aspects, the processor 244 may prioritize display screen 108 access (or any other vehicle input device) based on a time of receiving the request from respective users. For example, the processor 244 may provide access to a user who transmitted the request first. Furthermore, although the example described above describes an aspect where the user sitting in the driver sitting area is given priority over the passenger, the present disclosure is not limited to such a prioritization criterion. In other aspects, the user sitting in the passenger sitting area (or any other position inside the vehicle 202) may get priority over the user sitting in the driver sitting area to access one or more vehicle input devices, without departing from the present disclosure scope.

In further aspects, the processor 244 may determine display screen 108 usage (or any other vehicle input device) responsive to the activating the display screen 108 to enable the first user 104 to operate the user device 204 via the display screen 108. Specifically, the processor 244 may determine whether the first user 104 is actually using the display screen 108 to operate the user device 204. In some aspects, the processor 244 may determine display screen usage when the processor 244 determines that the second user 402 may be operating a user device associated with the second user 402 and may desire to use the display screen 108 (based on images obtained from the camera 110 or a request received from the user device associated with the second user 402). Responsive to a determination that the first user 104 may not be using the display screen 108 for a predefined time duration, the processor 244 may determine that the display screen 108 may be available for "re-allocation". In this case, the processor 244 may re-allocate the display screen 108 to the second user 402 (specifically to the user device associated with the second user 402). In such a scenario, the processor 244 may activate the display screen 108 to enable the second user 402 to control operation of the user device associated with the second user 402 via the display screen 108. In this case, the display screen 108 may display content associated with the user device associated with the second user 402.

In additional aspects, the processor 244 may enable the first user 104 and the second user 402 to share the display screen 108, which may increase display screen utilization. For example, the processor 244 may display the content associated with the user device 204 on the display screen 108 when the first user 104 may be viewing the display screen 108 (as determined via the images obtained from the camera 110, such as by tracking the eyes of the first user). Further, the processor 244 may display the content associated with the user device associated with the second user 402 when the second user 402 may be viewing the display screen 108 (as determined via the images obtained from the camera 110).

In further aspects, when the vehicle 202 includes an extended vehicle display screen, the processor 244 may enable the first user 104 and the second user 402 to share the extended vehicle display screen such that a first display screen portion may be allocated to the first user 104, and a second display screen portion may be allocated to the second user 402. The first display screen portion may be in front of a first user sitting area position, and the second display screen portion may be in front of a second user sitting area position. In this manner, both the first user 104 and the second user 402 may view the extended vehicle display screen simultaneously. The content displayed on the first display screen portion and the second display screen portion may be same or different. For example, when the first user 104 desires to show content associated with the user device 204 to the second user 402, the first user 104 may use the first display screen portion and the second display screen portion to show the same content conveniently.

In further aspects, the processor 244 may be configured to determine sitting positions of the first user 104 and the second user 402 inside the vehicle 202 (e.g., based on the images obtained from the camera 110) and may allocate different vehicle input devices to the first and second users 104, 402 based on respective sitting positions. For example, as depicted in FIG. 5, the first user 104 may be sitting in a driver sitting area and the second user 402 may be sitting at a rear sitting area. Responsive to determining the sitting positions, the processor 244 may determine that a second vehicle input device (e.g., a second display screen 502 that may be communicatively coupled to the user device associated with the second user 402) may be in proximity to the second user sitting position, and the display screen 108 may be in proximity to the first user sitting position. The processor 244 may be further configured to activate the second display screen 502 for the user device associated with the second user 402 to enable the second user 402 to operate the user device associated with the second user 402 via the second display screen 502. Similarly, the processor 244 may activate the display screen 108 for the user device 204 to enable the first user 104 to operate the user device 204 via the display screen 108. Stated another way, the processor 244 may select the vehicle input device(s) based on the sitting positions of vehicle users/occupants in the vehicle 202, and activate the select vehicle input device(s) accordingly. In some aspects, the processor 244 may determine availability of the display screen 108 and the second display screen 502 before allocating respective devices to the first user 104 and/or the second user 402. In some aspects, the processor 244 may perform automatic assignment of vehicle input devices based on the sitting position. For example, when a user sits on a sitting position in the vehicle 202, the processor 244 may automatically assign the display screen in front of the user to the user.

In further aspects, the processor 244 may be configured to track usage of all activated vehicle input devices, and may deactivate the vehicle input devices based on respective usage. For example, when the usage of a vehicle input device (e.g., the display screen 108) is below a predefined usage threshold, the processor 244 may deactivate the display screen 108 or put the display screen 108 in sleep mode (e.g., activate a sleep mode for the display screen 108) to reduce energy utilization in the vehicle 202.

In addition, the processor 244 may monitor (e.g., based on the images obtained from the camera 110) orientation of each user in the vehicle 202 who may be using the vehicle input devices (e.g., the display screen 108 and the second display screen 502) to operate respective user devices. Based on the orientation, the processor 244 may determine whether the first user 104 and the second user 402 may be viewing (or using) the display screen 108 and the second display screen 502, respectively. When the first user 104 and/or the second user 402 may not be viewing respective display screens for a predefined time interval/duration, the processor 244 may reduce/adjust brightness of respective display screens to reduce energy utilization in the vehicle 202.

In further aspects, the processor 244 may be configured to obtain images from the camera 110, and may control audio devices in the vehicle 202 (e.g., to provide audio feedback to users) based on the obtained images. Specifically, the processor 244 may prioritize the audio device(s) in the similar manner as the vehicle input devices described above based on the images, and activate the audio devices based on prioritization. For example, the processor 244 may activate the audio device for entire vehicle 202 when a single user may be present in the vehicle 202, and may activate ceiling/headrest speakers and noise cancellation when multiple users may be present in the vehicle 202 (e.g., to isolate each occupant/user from other occupants/users).

The vehicle 202 may further include electrochromic windows that may be configured to tint window glasses. In certain aspects, the processor 244 may be configured to determine that the first user 104 (or any other user) may be experiencing glare on the display screen 108, based on the inputs obtained from the sensory system 234 and/or images obtained from the camera 110. For example, the processor 244 may perform such determination by obtaining images from the camera 110 and performing image processing on the obtained images to determine if the first user 104 may be experiencing glare. In additional aspects, the processor 244 may determine that the first user 104 may be experiencing glare based on user inputs obtained via the display screen 108 or the user device 204. Responsive to a determination that the first user 104 may be experiencing glare, the processor 244 may cause the electrochromic windows to tint the window glasses. In some aspects, the processor 244 may cause tinting of all the window glasses. In other aspects, the processor 244 may select one or more window glasses to be tinted. The selection of the one or more window glasses may be based on the first user sitting position in the vehicle 202.

In further aspects, the processor 244 may monitor the content displayed on each screen (e.g., the display screen 108 and the second display screen 502), and may change/adjust refresh-rate based on the content displayed or the operation performed using the screen. For example, the processor 244 may increase the refresh-rate when a game or a movie may be displayed on the screen, but may not increase the refresh rate when music may be playing. In addition, the processor 244 may determine user preferences to use the vehicle input devices based on user inputs obtained from the user device 203, and may activate the vehicle input devices based on the user preferences.

Figure 6:
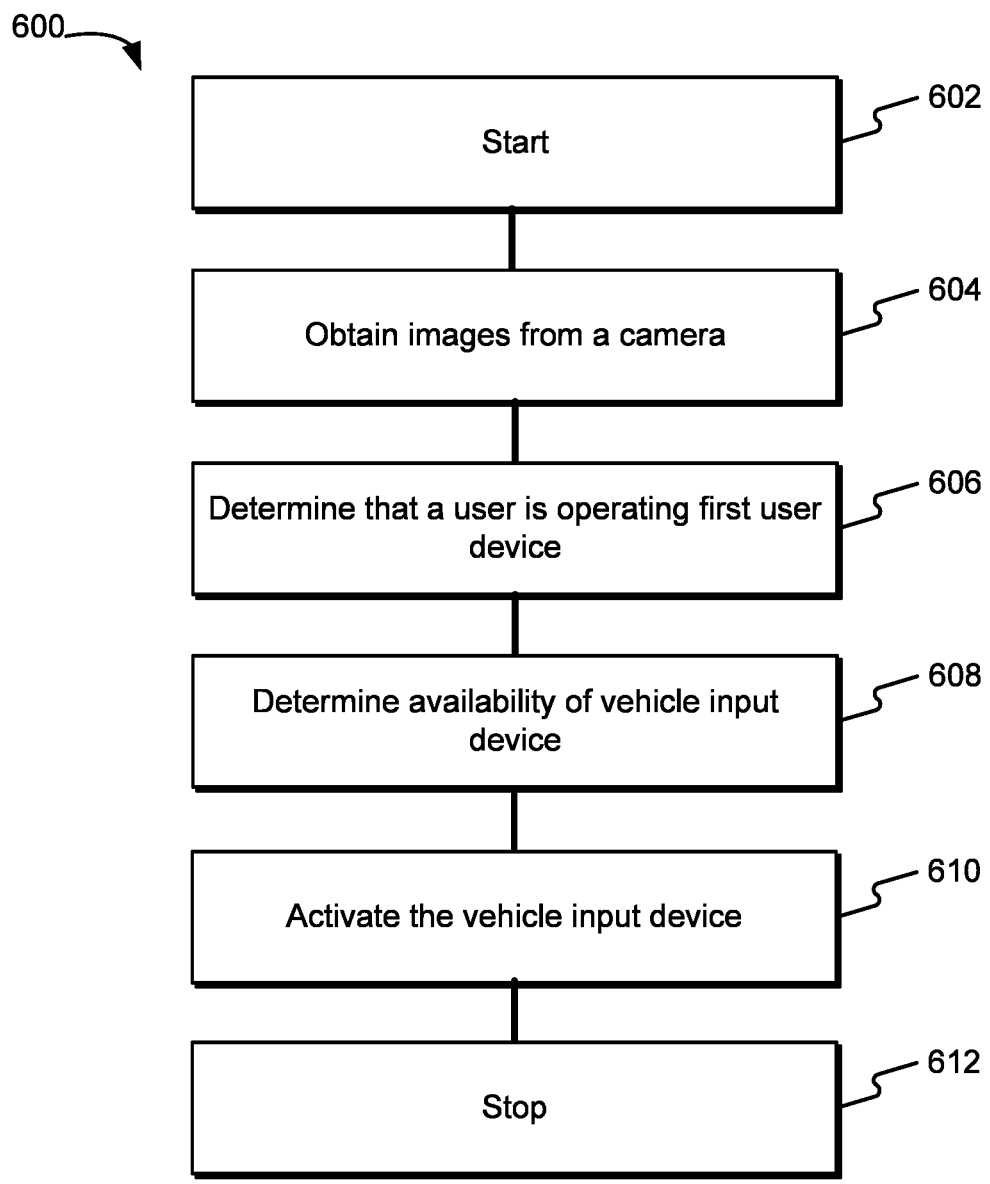
FIG. 6 depicts a flow diagram of an example method for managing vehicle workspace in accordance with the present disclosure.

FIG. 6 depicts a flow diagram of an example method 600 for managing vehicle workspace in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include obtaining, by the processor 244, images from the camera 110. As described above, the camera 110 may capture images of a user (e.g., the first user 104) who may be present in the vehicle 202. At step 606, the method 600 may include determining, by the processor 244, that the first user 104 may be operating the user device 204 (e.g., a laptop) associated with the first user 104 in the vehicle 202 based on the obtained images.

At step 608, the method 600 may include determining, by the processor 244, availability of a vehicle input device (e.g., the display screen 108, the track pad 302, the monostable shifter 304, etc.) responsive to a determination that the first user 104 may be using the user device 204 in the vehicle 202. At step 610, the method 600 may include activating, by the processor 244, the vehicle input device to enable the first user 104 to operate the user device 204 via the vehicle input device when the vehicle input device may be available.

The method 600 ends at step 612.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
a first vehicle device communicatively coupled with a first user device associated with a first user, wherein the first vehicle device is configured to provide inputs to the first user device;
a camera configured to capture images of the first user in the vehicle; and a processor communicatively coupled with the first vehicle device and the camera, wherein the processor is configured to:
obtain the images;
determine that the first user is operating the first user device in the vehicle based on one or more of the images;
determine the first vehicle device is available responsive to a determination that the first user is operating the first user device;
activate the first vehicle device to enable the first user to operate the first user device via the first vehicle device; and
when usage of the first vehicle device is below a predefined usage threshold, deactivate the first vehicle device for the first user device or activate a first vehicle device sleep mode.

2. The vehicle of claim 1, wherein the first vehicle device comprises at least one of: a vehicle touch screen or a display screen, a vehicle track pad, and a monostable shifter.

3. The vehicle of claim 2, wherein the processor is further configured to:
monitor content displayed on the display screen; and
adjust refresh rate based on the content.

4. The vehicle of claim 2, wherein the processor is further configured to:
monitor orientation of the first user;
determine that the first user is not viewing the display screen for a predefined time duration based on the orientation; and
reduce brightness of the display screen based on the determination.

5. The vehicle of claim 1, wherein the processor is further configured to:
obtain a request from the first user device to allocate the first vehicle device to the first user; and
determine the availability of the first vehicle device responsive to obtaining the request.

6. The vehicle of claim 1, wherein the processor is further configured to:
determine a usage of the first vehicle device responsive to activating the first vehicle device to enable the first user to operate the first user device via the first vehicle device.

7. The vehicle of claim 1, wherein the first vehicle device is further communicatively coupled with a second user device associated with a second user in the vehicle.

8. The vehicle of claim 7, wherein the camera is further configured to capture images of the second user in the vehicle, and wherein the processor is further configured to:
determine that the second user is operating the second user device in the vehicle based on the images;
determine the availability of the first vehicle device responsive to a determination that the second user is operating the second user device; and
activate the first vehicle device to enable the second user to operate the second user device via the first vehicle device when the first vehicle device is available.

9. The vehicle of claim 8, wherein the processor is further configured to:
obtain a request from the second user device to allocate the first vehicle device to the second user; and
determine the availability of the first vehicle device responsive to obtaining the request.

10. The vehicle of claim 8, wherein the processor is further configured to:
determine a second user position in the vehicle based on the images of the second user captured by the camera;
determine that a second vehicle device is in proximity to the second user position; and activate the second vehicle device to enable the second user to operate the second user device via the second vehicle device based on a determination that the second vehicle device is in proximity to the second user position.

11. The vehicle of claim 1, wherein the processor is further configured to activate a vehicle audio device based on the images.

12. The vehicle of claim 1 further comprising electrochromic windows configured to tint window glasses.

13. The vehicle of claim 12, wherein the processor is further configured to:
determine that the first user is experiencing glare on the first vehicle device; and
cause the electrochromic windows to tint the window glasses based on a determination that the first user is experiencing glare on the first vehicle device.

14. A method to manage a vehicle workspace, the method comprising:
obtaining, by a processor, images from a camera installed in a vehicle, wherein the camera is configured to capture images of a first user in the vehicle;
determining, by the processor, that the first user is operating a first user device in the vehicle based on the images;
determining, by the processor, an availability of a first vehicle device responsive to a determination that the first user is operating the first user device, wherein the first vehicle device is communicatively coupled with the first user device associated with the first user, and wherein the first vehicle device is configured to provide inputs to the first user device;
activating, by the processor, the first vehicle device to enable the first user to operate the first user device via the first vehicle device when the first vehicle device is available; and
deactivating the first vehicle device for the first user device when the usage is below a predefined usage threshold.

15. The method of claim 14, wherein the first vehicle device comprises at least one of: a vehicle touch screen or a display screen, a vehicle track pad, and a monostable shifter.

16. The method of claim 14 further comprising:
obtaining a request from the first user device to allocate the first vehicle device to the first user; and
determining the availability of the first vehicle device responsive to obtaining the request.

17. The method of claim 14 further comprising:
determining a usage of the first vehicle device responsive to activating the first vehicle device to enable the first user to operate the first user device via the first vehicle device.

18. A non-transitory computer-readable storage medium having instructions stored thereupon which, when executed by a processor, cause the processor to:
obtain images from a camera installed in a vehicle, wherein the camera is configured to capture images of a first user in the vehicle;
determine that the first user is operating a first user device in the vehicle based on the images;
determine an availability of a first vehicle device responsive to a determination that the first user is operating the first user device, wherein the first vehicle device is communicatively coupled with the first user device associated with the first user, and wherein the first vehicle device is configured to provide inputs to the first user device;
activate the first vehicle device to enable the first user to operate the first user device via the first vehicle device when the first vehicle device is available; and
deactivate the first vehicle device for the first user device when the usage is below a predefined usage threshold.

* * * * *